United States Patent [19]
Mihara

[11] Patent Number: 4,911,540
[45] Date of Patent: Mar. 27, 1990

[54] ZOOM LENS SYSTEM
[75] Inventor: Shinichi Mihara, Hachioji, Japan
[73] Assignee: Olympus Optical Co., Ltd., Tokyo, Japan
[21] Appl. No.: 355,673
[22] Filed: May 23, 1989
[30] Foreign Application Priority Data Jun. 16, 1988 [JP] Japan .................................. 63-146789

[51] Int. Cl.$^4$ .......................... G02B 15/14; G02B 9/64
[52] U.S. Cl. .................................................. 350/427
[58] Field of Search ......................................... 350/427

[56] References Cited

U.S. PATENT DOCUMENTS 3,160,699 12/1964 Yamaji .
3,697,155 10/1972 Ruben ................................. 350/427
3,972,592 8/1976 Ruben .
4,810,071 3/1989 Tsuchida et al. .

FOREIGN PATENT DOCUMENTS 54-143127 11/1979 Japan .
62-198813 9/1987 Japan .
63-49719 3/1988 Japan .
63-85516 4/1988 Japan .

Primary Examiner—Rodney B. Bovernick
Assistant Examiner—Rebecca D. Gass
Attorney, Agent, or Firm—Kenyon & Kenyon

[57] ABSTRACT

A zoom lens system comprising, in the order from the object side, a first lens unit including a positive lens component, a second lens unit of negative refractive power including two negative lens components, a third lens unit having positive refractive power including a positive lens component, and a fourth lens unit including three or four lens components: a positive lens component, a negative lens component and one or two positive lens components. During zooming, the first and fourth lens units are fixed, and the second and third lens units are shifted in the direction of the optical axis with the distance between both units being varied for zooming and correcting the shift of the image position. This zoom lens system has a small number of lens components, and aberrations are properly corrected.

7 Claims, 13 Drawing Sheets

ZOOM LENS SYSTEM

BACKGROUND OF THE INVENTION

1. Field of the Invention

This invention relates to a zoom lens system for cameras, and more particularly to a zoom lens system for video cameras having electronic image pick-up devices as image sensors.

2. Description of the Related Art

In recent years, compact and lightweight video cameras have been offered at low prices, and the demand for video cameras for private use is increasing rapidly. In order to further develop this demand, it is necessary to design much more compact video cameras having lower weight and manufacturable at lower cost, thereby posing problems to obtain much more compact lens systems having lower weight and manufacturable at lower cost.

In general, it is difficult to design a compact, lightweight and inexpensive zoom lens system having a high zooming ratio and a large aperture ratio unless epoch-making inventions of optical glass material, etc., are made.

Therefore, as a solution, it has been tried to use a lens of a fixed focal length to minimize the camera, and such video cameras are on the market. However, a video camera using a lens system of a fixed focal length has the drawback that image variation is extremely limited.

Thus, attention is paid to zoom lens systems specified for a zooming ratio of about 2 to 3 and an aperture ratio of about F/2 to F/2.8 which are intermediates between the existing zoom lens systems of wide focal length variation ranges specified for a large aperture ratio of about F/1.2 to F/1.4 and a zooming ratio of about 6. Attention is also drawn to vari-focal lens systems having two focal lengths which can be changed over.

Examples of the vari-focal lens systems of this type are disclosed in Japanese Laid-Open Patent Applications, Publication Nos. 62-198813 and 63-49719. These vari-focal lens systems comprises a small number of lens components, that is, less than ten in total, are compact and lightweight, and have good imaging characteristics. However, the first lens unit, the diameter of which tends to be large, comprises a plurality of lens components and are large in diameter and heavy. In particular, it is not preferable to perform autofocusing, which is indispensable for modern cameras, by driving the heavy first lens unit because a large quantity of power is consumed and the response is delayed.

Further, in order to correct chromatic aberration properly over the focal length variation range of a zoom lens system, it is necessary to correct chromatic aberration to a certain extent in each lens unit. Therefore, conventional zoom lens systems have at least one positive lens component and at least one negative lens component in each lens unit, and the total number of lens components of the lens system is larger than ten so that other types of aberrations can be properly corrected. In many cases, the first lens unit also comprises a plurality of lens components.

Japanese Laid-Open Patent Applications, Publication Nos. 54-143127 and 63-85516 disclose zoom lens systems in which the first lens unit comprises a single lens and the second and third lens units are designed individually under certain conditions to overcorrect chromatic aberration so that the total chromatic aberration of the lens system can be corrected properly. The zoom lens system disclosed in Publication No. 54-143127 corrects chromatic aberration independently in the third lens unit, thus the third lens unit must comprise a plurality of lens components, and the zoom lens as a whole has nine lens components. The zoom lens disclosed in Publication No. 63-85516 overcorrects chromatic aberration individually in the second and third lens units, so that the total number of lens components contained in the zoom lens is eleven.

SUMMARY OF THE INVENTION

An object of the present invention is to provide a zoom lens system having a small number of lens components, such as seven to eight components in total, in which the first lens unit includes a single lens component and other lens units include a small number of lens components.

Another object of the present invention is to provide a zoom lens system having a small number of lens components in which chromatic aberration and other types of aberrations are properly corrected.

Still another object of the present invention is to provide a compact and lightweight zoom lens system specified for a zooming ration of about 2 to 3 and an aperture ratio of about F/2.0 to F/2.8.

In order to attain the above objects, a zoom lens system according to the present invention comprises, in the order from the object side, a first lens unit including a positive lens component, a second lens unit including at least two negative lens components, a third lens unit including at least one positive lens component, and a fourth lens unit including three or four lens components: a positive lens component, a negative lens component and one or two positive lens components. During zooming, the first and fourth lens units are fixed, and the second and third lens units are shifted in the direction of the optical axis with the distance between both units being varied for zooming and correcting the shift of the image position. The zoom lens system satisfies the following conditions (1), (2) and (3):

$$0.9 < |\beta_{23S}| < 1.5 \tag{1}$$

$$25 < \nu_{II} - \nu_{III}, \nu_{II} = (\nu_{II-1} - \nu_{II-2})/2 \tag{2}$$

$$0.4 < |\beta_{2T}| < 1 \tag{3}$$

where $\beta_{23S}$ is the composite magnification of the second and third lens units when the focal length of the whole system $f_S = \sqrt{f_W \cdot f_W}$; $\beta_{2T}$ is the magnification of the second lens unit at the tele position; $\nu_{II}$ is the mean value of the Abbe numbers of the lens components in the second lens unit; and $\nu_{III}$ is the Abbe number of the third lens unit. $f_W$ and $f_T$ are the focal lengths of the whole system at the wide and tele positions, respectively; and $\nu_{II-1}$ and $\nu_{II-2}$ are the Abbe numbers of the negative lens components in the second lens unit.

The zoom lens system according to the present invention is not of the type in which the chromatic aberration caused by the first lens unit having a single lens component is corrected by overcorrecting the chromatic aberration of the second and third lens units individually. This zoom lens system corrects the chromatic aberration of the whole lens system properly by overcorrecting chromatic aberration by means of the combination of the second and third lens units.

Overcorrecting chromatic aberration by means of the combination of the second and third lens units is difficult because the distance between both units is varied widely during zooming. According to the present invention, the variation of the distance between the second and third lens units is minimized while the shift of the focal point caused by zooming is reduced.

In a four-unit zoom lens system, such as that of the present invention, comprising a first lens unit having positive refractive power, a second lens unit having negative refractive power, a third lens unit having positive refractive power, and a fourth lens unit having positive refractive power, the second and third lens units being movable for zooming and correcting the shift of the image position, the distance $D_{II}$ between the second and third lens units varies approximately in the form of a quadratic function of the logarithm of the focal length. Therefore, the variation of $D_{II}$ in the focal length variation range is the smallest if Dhas its extreme value when the focal length of the whole system is $\sqrt{f_W \cdot f_T}$, that is, if the composite magnification $\beta_{23S}$ of the second and third lens units at that time is 1. For this reason, the zoom lens system of this invention satisfies the above condition (1).

If the upper or lower limit in the condition (1) is exceeded, the variation of the distance $D_{II}$ between the second and third lens units during zooming becomes large, and the variation of chromatic aberration during zooming becomes large, which is contrary to one of the objects of the present invention.

Further, in order to reduce the variation of chromatic aberration during zooming, it is necessary that the mean value of the Abbe numbers of the two negative lens components in the second lens unit satisfy the condition (2).

If the lower limit value of 25 in this condition is exceeded, the variation of chromatic aberration during zooming becomes large, and longitudinal chromatic aberration tends to be undercorreted at the tele position or overcorrected at the wide position. With respect to chromatic aberration of magnification, an image formed by light of a short wavelength tends to be larger in the tele position and smaller in the wide position than an image formed by light of a reference wavelength.

If the above conditions are satisfied, it is possible to provide a zoom lens system wherein the first lens unit, which is large and heavy, comprises a single lens component, and wherein the total number of lens components in the whole lens system is seven or eight without increasing the number of lens components in other units, and wherein the variation of chromatic aberration during zooming is reduced.

Further, in order to reduce the diameter of the lens component in the first lens unit for lightening the first group to attain one of the objects of the present invention, it is necessary to locate the entrance pupil as near as possible to the first lens unit. For that purpose, it is necessary to minimize the moving space for the second and third lens units. That is, in order to make good use of the moving space for the second lens unit having the function of focal length variation, it is important that the movement of the third lens unit do not hinder the movement of the second lens unit.

Let the distance between the first and second lens units be $D_I$ and the distance between the third and fourth lens units be $D_{III}$. $D_I$ must be minimum at the wide position, and $D_{II}$ and $D_{III}$ must be minimum at the tele position. In order that $D_{III}$ is minimum at the tele position, it is necessary that $D_{III}$ have no extreme value in the focal length variation range. When the focal length is such that $D_{III}$ has its extreme value, the magnification of the second lens unit is 1. Therefore, it is necessary that $|\beta_{2T}| <$ in order that $D_{III}$ is minimum at the tele position. If $|\beta_{2T}| > 1$, $D_{III}$ is not minimum at the tele position, and the moving space is wasteful so that it is difficult to reduce the diameter of the first lens unit. On the other hand, if $|\beta_{2T}| < 0.4$, the refractive power of the second and third lens units becomes unnecessarily strong, and the variations of spherical aberration, coma, astigmatism, distortion, etc., tends to be large, which is not preferable.

From the foregoing, it is necessary to satisfy the condition (3).

The efficiency of focal length variation of a zoom lens system according to the present invention will be low since the second lens unit having negative refractive power and the third lens unit having positive refractive power are shifted substantially in the same direction for zooming. According to the present invention, reducing the variation of D, satisfying the conditions (1), (2) and (3), and further satisfying the conditions (4) and (5) set forth below make it possible to strengthen the refractive power of the second and third lens units without deteriorating respective aberrations, thus to obtain a desired zooming ratio. Moreover, if the composite magnification of the second and third lens units at the tele position satisfies the following condition (6), the moving space can be small, and the entrance pupil will not be far away from the first lens unit. That is, according to the present invention, a lens system having a desired zooming ratio with the diameter of the foremost lens component being small can be obtained by further satisfying the following conditions (4), (5) and (6):

$$0.07 < |n_{III} - n_{II}| < 0.3 \tag{4}$$

$$0.5 < r_{III-1} / r_{II-4} < 1.1 \tag{5}$$

$$0.7 < |f_{II\,III\,T}|/ \sqrt{f_W \cdot f_T} < 1.2 \tag{6}$$

where $n_{II}$ is the refractive index of one of the negative lens components in the second lens unit, $n_{III}$ is the refractive index of the positive lens component in the third lens unit, $r_{II-4}$ is the radius of curvature of the fourth surface of the second lens unit, $r_{III-1}$ is the radius of curvature of the first surface (on the object side) of the third lens unit, and $f_{II\,III\,T}$ is the composite focal length of the second and third lens units at the tele position.

As stated above, the conditions (4) and (5) are laid down to strengthen the refractive pwer of the movable lens units without deteriorating respective aberrations. The condition (4) is to ensure that the difference between the refractive index of the positive lens component in the third lens unit and the refractive index of at least one of the negative lens components in the second lens unit has an appropriate value. The condition (5) is to ensure that the radii of curvature of the surfaces facing each other of the second and third lens units have appropriate values.

If the lower limit of 0.07 in the condition (4) is exceeded, the variations of spherical aberration, coma, astigmatism and distortion tends to be large, and Petzval's sum also tends to be a large positive value. If the upper limit of 0.3 in the condition (4) is exceeded, the refractive power will be weak so that a large moving space for zooming is necessary.

If the upper limit of 1.1 in the condition (5) is exceeded, spherical aberration will be undercorrected near the intermediate focal length. If the lower limit of 0.5 is exceeded, spherical aberration will be overcorrected.

If the upper limit of 1.2 in the condition (6) is exceeded, a large moving space is necessary, and the diameter of the foremost lens component tends to be large. If the lower limit of 0.7 is exceeded, the variations of respective aberrations during zooming will be large.

DETAILED DESCRIPTION OF THE PREFERRED EMBODIMENTS

Figure 1:
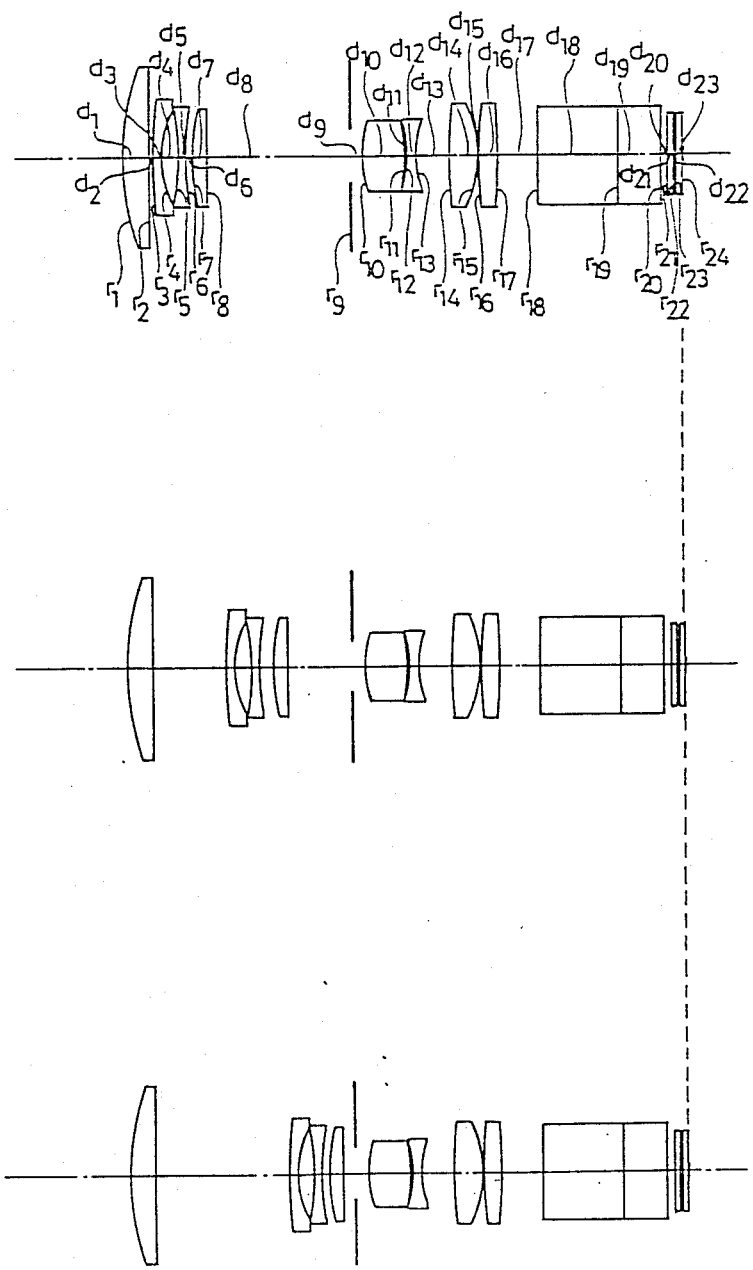
FIG. 1 shows sectional views illustrating compositions of Embodiments 1 and 7 according to the present invention.

Now, the zoom lens system according to the present invention will be detailedly described below with reference to the preferred embodiments having the following data:

Embodiment 1
$f = 10 - 25$ mm, F/2.7
$2\omega = 45.8° - 19°$
$r_1 = 31.4963$
  $d_1 = 3.1000$    $n_1 = 1.69680$    $\nu_1 = 55.52$
$r_2 = \infty$
  $d_2 = D_1$ (variable)
$r_3 = 90.9077$
  $d_3 = 0.9000$    $n_2 = 1.69680$    $\nu_2 = 55.52$
$r_4 = 12.2250$
  $d_4 = 2.1000$
$r_5 = -25.9153$
  $d_5 = 0.9000$    $n_3 = 1.69680$    $\nu_3 = 55.52$
$r_6 = 34.6067$
  $d_6 = D_2$ (variable)
$r_7 = 25.4759$
  $d_7 = 1.8000$    $n_4 = 1.84666$    $\nu_4 = 23.78$
$r_8 = \infty$
  $d_8 = D_3$ (variable)
$r_9 = \infty$ (stop)
  $d_9 = 1.5000$
$r_{10} = 12.1366$
  $d_{10} = 5.0000$    $n_5 = 1.77250$    $\nu_5 = 49.66$
$r_{11} = -17.8647$
  $d_{11} = 0.2500$
$r_{12} = -11.8425$
  $d_{12} = 1.0000$    $n_6 = 1.78472$    $\nu_6 = 25.68$
$r_{13} = 11.8425$
  $d_{13} = 3.8357$
$r_{14} = 75.7918$
  $d_{14} = 3.2000$    $n_7 = 1.78590$    $\nu_7 = 44.18$
$r_{15} = -14.5977$
  $d_{15} = 0.1500$
$r_{16} = 53.2554$
  $d_{16} = 2.2000$    $n_8 = 1.78590$    $\nu_8 = 44.18$
$r_{17} = -72.7609$
  $d_{17} = 4.6000$
$r_{18} = \infty$
  $d_{18} = 9.4000$    $n_9 = 1.51633$    $\nu_9 = 64.15$
$r_{19} = \infty$
  $d_{19} = 5.1000$    $n_{10} = 1.54771$    $\nu_{10} = 62.83$
$r_{20} = \infty$
  $d_{20} = 0.9000$
$r_{21} = \infty$
  $d_{21} = 0.7000$    $n_{11} = 1.51633$    $\nu_{11} = 64.15$
$r_{22} = \infty$
  $d_{22} = 0.3100$
$r_{23} = \infty$
  $d_{23} = 0.6000$    $n_{12} = 1.48749$    $\nu_{12} = 70.20$
$r_{24} = \infty$

| f | 10 | 16 | 25 |
|---|---|---|---|
| $D_1$ | 0.600 | 9.009 | 16.145 |
| $D_2$ | 0.800 | 1.648 | 0.800 |
| $D_3$ | 26.845 | 7.588 | 1.300 |

$\beta_{23S} = -0.997$, $\nu_{III} - \nu_{III} = 31.74$
$\beta_{2T} = -0.626$, $n_{III} - n_{II} = 0.14986$ $r_{III-1}/r_{II-4} = 0.736$, $|f_{II\,IIIT}|/\sqrt{f_W f_T} = 1.037$ Embodiment 2
$f = 10 - 25$ mm, F/2.7
$2\omega = 45.8° - 19°$
$r_1 = 31.1543$
  $d_1 = 3.1000$    $n_1 = 1.69680$    $\nu_1 = 55.52$
$r_2 = \infty$
  $d_2 = D_1$ (variable)
$r_3 = 86.9196$
  $d_3 = 0.9000$    $n_2 = 1.69680$    $\nu_2 = 55.52$
$r_4 = 12.7450$
  $d_4 = 2.1000$
$r_5 = -26.6629$
  $d_5 = 0.9000$    $n_3 = 1.69680$    $\nu_3 = 55.52$
$r_6 = 34.5407$
  $d_6 = D_2$ (variable)
$r_7 = 28.6157$
  $d_7 = 1.8000$    $n_4 = 1.84666$    $\nu_4 = 23.78$
$r_8 = \infty$
  $d_8 = D_3$ (variable)
$r_9 = \infty$ (stop)
  $d_9 = 1.5000$
$r_{10} = 10.7294$
  $d_{10} = 5.0000$    $n_5 = 1.77250$    $\nu_5 = 49.66$
$r_{11} = -16.2366$
  $d_{11} = 0.2500$
$r_{12} = -11.4257$
  $d_{12} = 1.0000$    $n_6 = 1.78472$    $\nu_6 = 25.68$
$r_{13} = 11.4257$
  $d_{13} = 4.8589$
$r_{14} = 28.2322$ (aspherical surface)
  $d_{14} = 4.0000$    $n_7 = 1.78590$    $\nu_7 = 44.18$
$r_{15} = -13.3153$
  $d_{15} = 4.0000$
$r_{16} = \infty$
  $d_{16} = 9.4000$    $n_8 = 1.51633$    $\nu_8 = 64.15$
$r_{17} = \infty$
  $d_{17} = 5.1000$    $n_9 = 1.54771$    $\nu_9 = 62.83$
$r_{18} = \infty$
  $d_{18} = 0.9000$
$r_{19} = \infty$
  $d_{19} = 0.7000$    $n_{10} = 1.51633$    $\nu_{10} = 64.15$
$r_{20} = \infty$
  $d_{20} = 0.3100$
$r_{21} = \infty$
  $d_{21} = 0.6000$    $n_{11} = 1.48749$    $\nu_{11} = 70.20$
$r_{22} = \infty$ aspherical coefficients
$E = -0.10746 \times 10^{-3}$, $F = -0.97956 \times 10^{-7}$

| f | 10 | 16 | 25 |
|---|---|---|---|

-continued

|  |  |  |  |
|---|---|---|---|
| $D_1$ | 0.600 | 8.928 | 15.898 |
| $D_2$ | 0.800 | 1.804 | 0.800 |
| $D_3$ | 16.598 | 7.267 | 1.300 |

$\beta_{23S} = -1.000$, $\nu_{II} - \nu_{III} = 31.74$
$\beta_{2T} = -0.678$, $n_{III} - n_{II} = 0.14986$ $r_{III-1}/r_{II-4} = 0.828$, $|f_{II\,IIIT}|/\sqrt{f_W f_T} = 1.020$ Embodiment 3

$f = 10 - 25$ mm, F/2.7
$2\omega = 45.8° - 19°$ $r_1 = 30.6645$
  $d_1 = 3.5000$    $n_1 = 1.69680$    $\nu_1 = 55.52$
$r_2 = \infty$
  $d_2 = D_1$ (variable)
$r_3 = 191.1413$
  $d_3 = 0.9000$    $n_2 = 1.69680$    $\nu_2 = 55.52$
$r_4 = 12.5335$
  $d_4 = 2.4000$
$r_5 = -25.3546$
  $d_5 = 0.9000$    $n_3 = 1.69680$    $\nu_3 = 55.52$
$r_6 = 37.8426$
  $d_6 = D_2$ (variable)
$r_7 = 25.7853$
  $d_7 = 1.9000$    $n_4 = 1.84666$    $\nu_4 = 23.78$
$r_8 = \infty$
  $d_8 = D_3$ (variable)
$r_9 = \infty$ (stop)
  $d_9 = 1.5000$
$r_{10} = 10.7102$
  $d_{10} = 4.8060$    $n_5 = 1.77250$    $\nu_5 = 49.66$
$r_{11} = -14.9416$
  $d_{11} = 0.2500$
$r_{12} = -9.6854$
  $d_{12} = 2.0698$    $n_6 = 1.84666$    $\nu_6 = 23.78$
$r_{13} = 9.6854$
  $d_{13} = 1.1163$
$r_{14} = 25.2106$
  $d_{14} = 4.1184$    $n_7 = 1.85026$    $\nu_7 = 32.28$
$r_{15} = -10.1394$
  $d_{15} = 4.0000$
$r_{16} = \infty$
  $d_{16} = 9.4000$    $n_8 = 1.51633$    $\nu_8 = 64.15$
$r_{17} = \infty$
  $d_{17} = 5.1000$    $n_9 = 1.54771$    $\nu_9 = 62.83$
$r_{18} = \infty$
  $d_{18} = 0.9000$
$r_{19} = \infty$
  $d_{19} = 0.7000$    $n_{10} = 1.51633$    $\nu_{10} = 64.15$
$r_{20} = \infty$
  $d_{20} = 0.3100$
$r_{21} = \infty$
  $d_{21} = 0.6000$    $n_{11} = 1.48749$    $\nu_{11} = 70.20$
$r_{22} = \infty$

| f | 10 | 16 | 25 |
|---|---|---|---|
| $D_1$ | 0.600 | 8.658 | 15.624 |
| $D_2$ | 0.800 | 1.658 | 0.800 |
| $D_3$ | 16.324 | 7.408 | 1.300 |

$\beta_{23S} = -0.993$, $\nu_{II} - \nu_{III} = 31.74$
$\beta_{2T} = -0.640$, $n_{III} - n_{II} = 0.14986$ $r_{III-1}/r_{II-4} = 0.681$, $|f_{II\,IIIT}|/\sqrt{f_W f_T} = 1.002$ Embodiment 4

$f = 10 - 20$ mm, F/2.7
$2\omega = 45.8° - 23.8°$ $r_1 = 24.8840$
  $d_1 = 3.2000$    $n_1 = 1.69680$    $\nu_1 = 55.52$
$r_2 = \infty$
  $d_2 = D_1$ (variable)
$r_3 = \infty$
  $d_3 = 0.9000$    $n_2 = 1.69680$    $\nu_2 = 55.52$
$r_4 = 10.0340$
  $d_4 = 2.1000$
$r_5 = -28.6323$
  $d_5 = 0.9000$    $n_3 = 1.69680$    $\nu_3 = 55.52$
$r_6 = 38.4081$
  $d_6 = D_2$ (variable)
$r_7 = 23.7772$
  $d_7 = 1.7000$    $n_4 = 1.84666$    $\nu_4 = 23.78$
$r_8 = \infty$
  $d_8 = D_3$ (variable)
$r_9 = \infty$ (stop)
  $d_9 = 1.5000$
$r_{10} = 10.9097$
  $d_{10} = 2.3000$    $n_5 = 1.77250$    $\nu_5 = 49.66$
$r_{11} = 16.5304$
  $d_{11} = 0.2500$
$r_{12} = -10.1448$
  $d_{12} = 3.0035$    $n_6 = 1.84666$    $\nu_6 = 23.78$
$r_{13} = 10.1448$
  $d_{13} = 0.6923$
$r_{14} = 20.7425$
  $d_{14} = 2.5000$    $n_7 = 1.85026$    $\nu_7 = 32.28$
$r_{15} = -9.7364$
  $d_{15} = 4.0000$
$r_{16} = \infty$
  $d_{16} = 9.4000$    $n_8 = 1.51633$    $\nu_8 = 64.15$
$r_{17} = \infty$
  $d_{17} = 5.1000$    $n_9 = 1.54771$    $\nu_9 = 62.83$
$r_{18} = \infty$
  $d_{18} = 0.9000$
$r_{19} = \infty$
  $d_{19} = 0.7000$    $n_{10} = 1.51633$    $\nu_{10} = 64.15$
$r_{20} = \infty$
  $d_{20} = 0.3100$
$r_{21} = \infty$
  $d_{21} = 0.6000$    $n_{11} = 1.48749$    $\nu_{11} = 70.20$
$r_{22} = \infty$

| f | 10 | 14 | 20 |
|---|---|---|---|
| $D_1$ | 0.600 | 5.783 | 10.282 |
| $D_2$ | 0.800 | 1.260 | 0.800 |
| $D_3$ | 10.982 | 5.338 | 1.300 |

$\beta_{23S} = -1.001$, $\nu_{II} - \nu_{III} = 31.74$
$\beta_{2T} = -0.610$, $n_{III} - n_{II} = 0.14986$ $r_{III-1}/r_{II-4} = 0.691$, $|f_{II\,IIIT}|/\sqrt{f_W f_T} = 0.968$ Embodiment 5

$f = 10 - 20$ mm, F/2.7
$2\omega = 45.8° - 23.8°$ $r_1 = 18.8561$ (aspherical surface)
  $d_1 = 5.000$    $n_1 = 1.49216$    $\nu_1 = 57.50$
$r_2 = -141.5073$
  $d_2 = D_1$ (variable)
$r_3 = 74.6283$
  $d_3 = 0.9000$    $n_2 = 1.49216$    $\nu_2 = 57.50$
$r_4 = 6.8432$
  $d_4 = 3.0000$
$r_5 = -16.6636$
  $d_5 = 0.9000$    $n_3 = 1.49216$    $\nu_3 = 57.50$
$r_6 = 14.1215$
  $d_6 = D_2$ (variable)
$r_7 = 12.6485$
  $d_7 = 2.2000$    $n_4 = 1.58362$    $\nu_4 = 30.37$
$r_8 = \infty$
  $d_8 = D_3$ (variable)
$r_9 = \infty$ (stop)
  $d_9 = 1.5000$
$r_{10} = 10.5399$
  $d_{10} = 2.4000$    $n_5 = 1.77250$    $\nu_5 = 49.66$
$r_{11} = -17.4206$
  $d_{11} = 0.2500$
$r_{12} = -9.9274$
  $d_{12} = 1.6767$    $n_6 = 1.84666$    $\nu_6 = 23.78$
$r_{13} = 9.9274$
  $d_{13} = 0.7778$
$r_{14} = 19.5010$
  $d_{14} = 2.5000$    $n_7 = 1.85026$    $\nu_7 = 32.28$
$r_{15} = -9.6564$
  $d_{15} = 4.0000$
$r_{16} = \infty$
  $d_{16} = 9.4000$    $n_8 = 1.51633$    $\nu_8 = 64.15$
$r_{17} = \infty$
  $d_{17} = 5.1000$    $n_9 = 1.54771$    $\nu_9 = 62.83$
$r_{18} = \infty$
  $d_{18} = 0.9000$
$r_{19} = \infty$
  $d_{19} = 0.7000$    $n_{10} = 1.51633$    $\nu_{10} = 64.15$ -continued $r_{20} = \infty$
$\quad d_{20} = 0.3100$
$r_{21} = \infty$
$\quad d_{21} = 0.6000 \quad n_{11} = 1.4879 \quad \nu_{11} = 70.20$
$r_{22} = \infty$ aspherical coefficients
$E = -0.32875 \times 10^{-5}, F = 0.86221 \times 10^{-7}$
$G = -0.76538 \times 10^{-10}$

| f | 10 | 14 | 20 |
|---|-----|-----|-----|
| $D_1$ | 0.600 | 5.291 | 9.353 |
| $D_2$ | 0.800 | 1.121 | 0.800 |
| $D_3$ | 10.053 | 5.042 | 1.300 |

$\beta_{2{3S}} = -1.000, \nu_{II} - \nu_{III} = 27.13$
$\beta_{2T} = -0.546, n_{III} - n_{II} = 0.09146$ $r_{III-1}/r_{II-4} = 0.896, |f_{II\,IIIT}|/\sqrt{f_W f_T} = 0.875$ Embodiment 6

$f = 10 - 20$ mm, F/2.7
$2\omega = 45.8° - 23.8°$ $r_1 = 25.2347$
$\quad d_1 = 3.2000 \quad n_1 = 1.69680 \quad \nu_1 = 55.52$
$r_2 = \infty$
$\quad d_2 = D_1$ (variable)
$r_3 = \infty$
$\quad d_3 = 0.9000 \quad n_2 = 1.69680 \quad \nu_2 = 55.52$
$r_4 = 10.2522$
$\quad d_4 = 2.1000$
$r_5 = -23.2600$
$\quad d_5 = 0.9000 \quad n_3 = 1.49216 \quad \nu_3 = 57.50$
$r_6 = 15.1177$
$\quad d_6 = D_2$ (variable)
$r_7 = 12.8008$
$\quad d_7 = 2.3000 \quad n_4 = 1.58362 \quad \nu_4 = 30.37$
$r_8 = \infty$
$\quad d_8 = D_3$ (variable)
$r_9 = \infty$ (stop)
$\quad d_9 = 1.5000$
$r_{10} = 10.8749$
$\quad d_{10} = 2.4000 \quad n_5 = 1.77250 \quad \nu_5 = 49.66$
$r_{11} = 21.2632$
$\quad d_{11} = 0.2500$
$r_{12} = -10.4033$
$\quad d_{12} = 3.9402 \quad n_6 = 1.84666 \quad \nu_6 = 23.78$
$r_{13} = 10.4033$
$\quad d_{13} = 0.3877$
$r_{14} = 17.5504$
$\quad d_{14} = 2.5000 \quad n_7 = 1.85026 \quad \nu_7 = 32.28$
$r_{15} = -9.8636$
$\quad d_{15} = 4.0000$
$r_{16} = \infty$
$\quad d_{16} = 9.4000 \quad n_8 = 1.51633 \quad \nu_8 = 64.15$
$r_{17} = \infty$
$\quad d_{17} = 5.1000 \quad n_9 = 1.54771 \quad \nu_9 = 62.83$
$r_{18} = \infty$
$\quad d_{18} = 0.9000$
$r_{19} = \infty$
$\quad d_{19} = 0.7000 \quad n_{10} = 1.51633 \quad \nu_{10} = 64.15$
$r_{20} = \infty$
$\quad d_{20} = 0.3100$
$r_{21} = \infty$
$\quad d_{21} = 0.6000 \quad n_{11} = 1.48749 \quad \nu_{11} = 70.20$
$r_{22} = \infty$

| f | 10 | 14 | 20 |
|---|-----|-----|-----|
| $D_1$ | 0.600 | 5.732 | 10.455 |
| $D_2$ | 0.800 | 1.123 | 0.800 |
| $D_3$ | 11.155 | 5.700 | 1.300 |

$\beta_{2{3S}} = -0.990, \nu_{II} - \mu_{III} = 27.13$
$\beta_{2T} = -0.519, n_{III} - n_{II} = 0.09146$ $r_{III-1}/r_{II-4} = 0.847, |f_{II\,IIIT}|/\sqrt{f_W f_T} = 0.986$ Embodiment 7

$f = 10 - 25$ mm, F/2.7
$2\omega = 45.8° - 19°$ $r_1 = 29.8807$
$\quad d_1 = 3.2000 \quad n_1 = 1.69680 \quad \nu_1 = 55.52$
$r_2 = \infty$
$\quad d_2 = D_1$ (variable)
$r_3 = 79.3576$
$\quad d_3 = 0.9000 \quad n_2 = 1.69680 \quad \nu_2 = 55.52$
$r_4 = 12.9097$
$\quad d_4 = 2.0000$
$r_5 = -30.3117$
$\quad d_5 = 0.9000 \quad n_3 = 1.69680 \quad \nu_3 = 55.52$
$r_6 = 36.1067$
$\quad d_6 = D_2$ (variable)
$r_7 = 33.0804$
$\quad d_7 = 1.6000 \quad n_4 = 1.84666 \quad \nu_4 = 23.78$
$r_8 = \infty$
$\quad d_8 = D_3$ (variable)
$r_9 = \infty$ (stop)
$\quad d_9 = 1.5000$
$r_{10} = 13.3289$
$\quad d_{10} = 5.0000 \quad n_5 = 1.77250 \quad \nu_5 = 49.66$
$r_{11} = -17.6804$
$\quad d_{11} = 0.2500$
$r_{12} = -11.9299$
$\quad d_{12} = 1.0000 \quad n_6 = 1.78472 \quad \nu_6 = 25.68$
$r_{13} = 11.9299$
$\quad d_{13} = 4.4506$
$r_{14} = 96.9053$
$\quad d_{14} = 3.2000 \quad n_7 = 1.77250 \quad \nu_7 = 49.66$
$r_{15} = -14.0181$
$\quad d_{15} = 0.1500$
$r_{16} = 49.3141$
$\quad d_{16} = 2.2000 \quad n_8 = 1.77250 \quad \nu_8 = 49.66$
$r_{17} = -61.4813$
$\quad d_{17} = 4.6000$
$r_{18} = \infty$
$\quad d_{18} = 9.4000 \quad n_9 = 1.51633 \quad \nu_9 = 64.15$
$r_{19} = \infty$
$\quad d_{19} = 5.1000 \quad n_{10} = 1.54771 \quad \nu_{10} = 62.83$
$r_{20} = \infty$
$\quad d_{20} = 0.9000$
$r_{21} = \infty$
$\quad d_{21} = 0.7000 \quad n_{11} = 1.51633 \quad \nu_{11} = 64.15$
$r_{22} = \infty$
$\quad d_{22} = 0.3100$
$r_{23} = \infty$
$\quad d_{23} = 0.6000 \quad n_{12} = 1.48749 \quad \nu_{12} = 70.20$
$r_{24} = \infty$

| f | 10 | 16 | 25 |
|---|-----|-----|-----|
| $D_1$ | 0.600 | 8.626 | 15.492 |
| $D_2$ | 3.000 | 3.099 | 0.800 |
| $D_3$ | 13.992 | 5.867 | 1.300 |

$\beta_{2{3S}} = -1.217, \nu_{II} - \nu_{III} = 31.74$
$\beta_{2T} = -0.843, n_{III} - n_{II} = 0.14986$ $r_{III-1}/r_{II-4} = 0.916, |f_{II\,IIIT}|/\sqrt{f_W f_T} = 1.038$ where the reference symbols $r_1, r_2, ...$ represent the radii of curvature on the surfaces of the respective lens components, the reference symbols $d_1, d_2, ...$ designate the thicknesses of the respective lens components and the airspaces reserved therebetween, the reference symbols $n_1, n_2, ...$ denote the refractive indices of the respective lens components, and the reference symbols $\nu_1, \nu_2, ...$ represent the Abbe numbers of the respective lens components.

Embodiment 1 has the composition illustrated in FIG. 1 wherein the first lens unit comprises a positive lens component, the second lens unit comprises two negative lens components, the third lens unit comprises a positive lens component, and the fourth lens unit comprises a positive lens component, a negative lens components and two positive lens components; thus the zoom lens system includes eight lens components in total.

Figure 3:
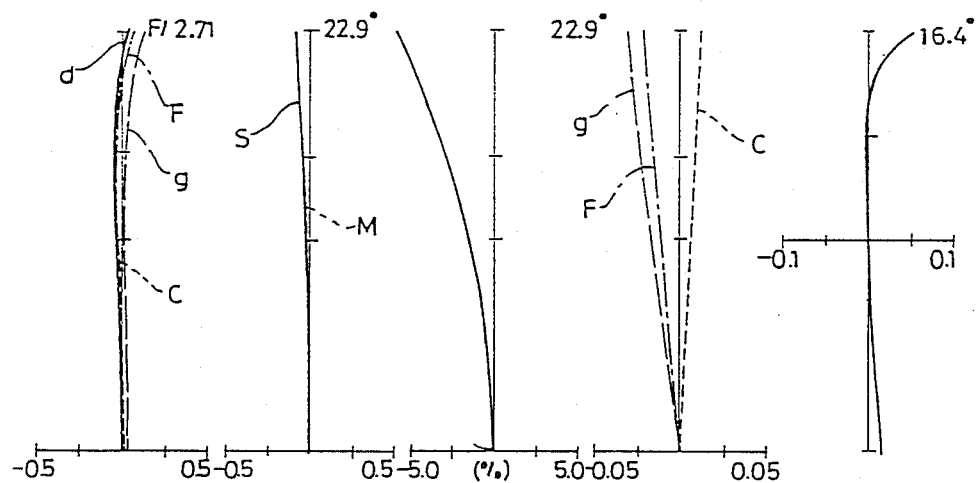
FIGS. 3 to 5 show curves illustrating aberration characteristics of Embodiment 1.
Figure 4:
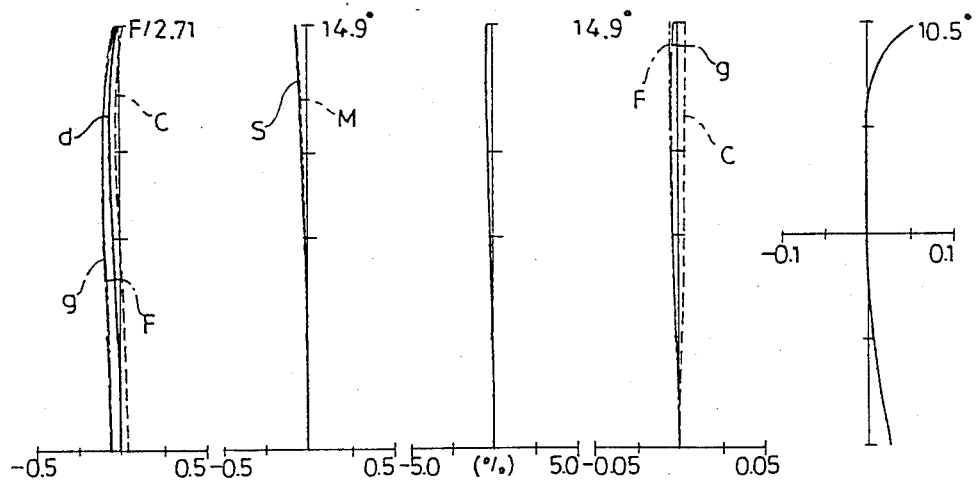
Figure 5:
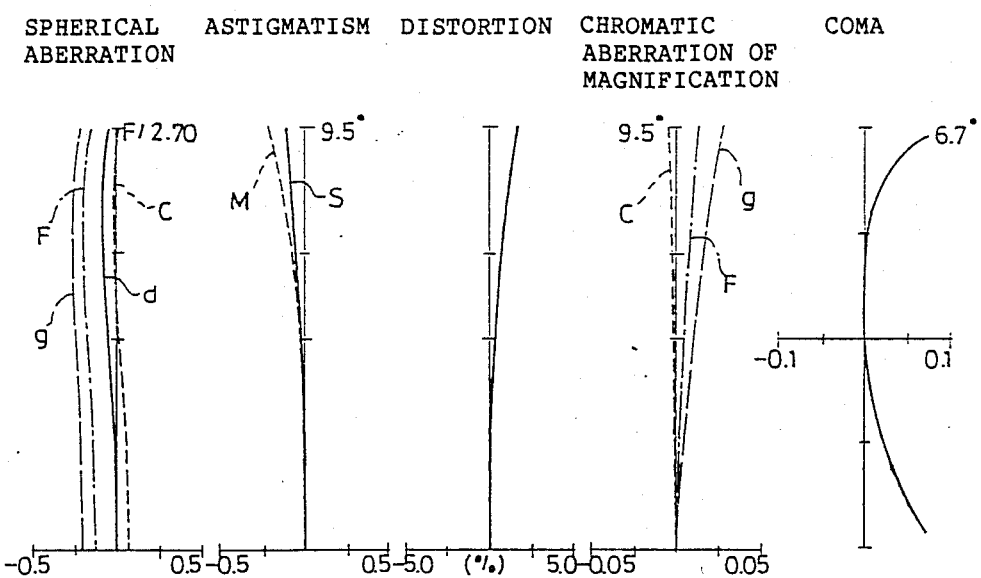

The aberration characteristics at the wide position, intermediate focal length and tele position of Embodiment 1 are illustrated in FIGS. 3, 4 and 5, respectively.

Figure 2:
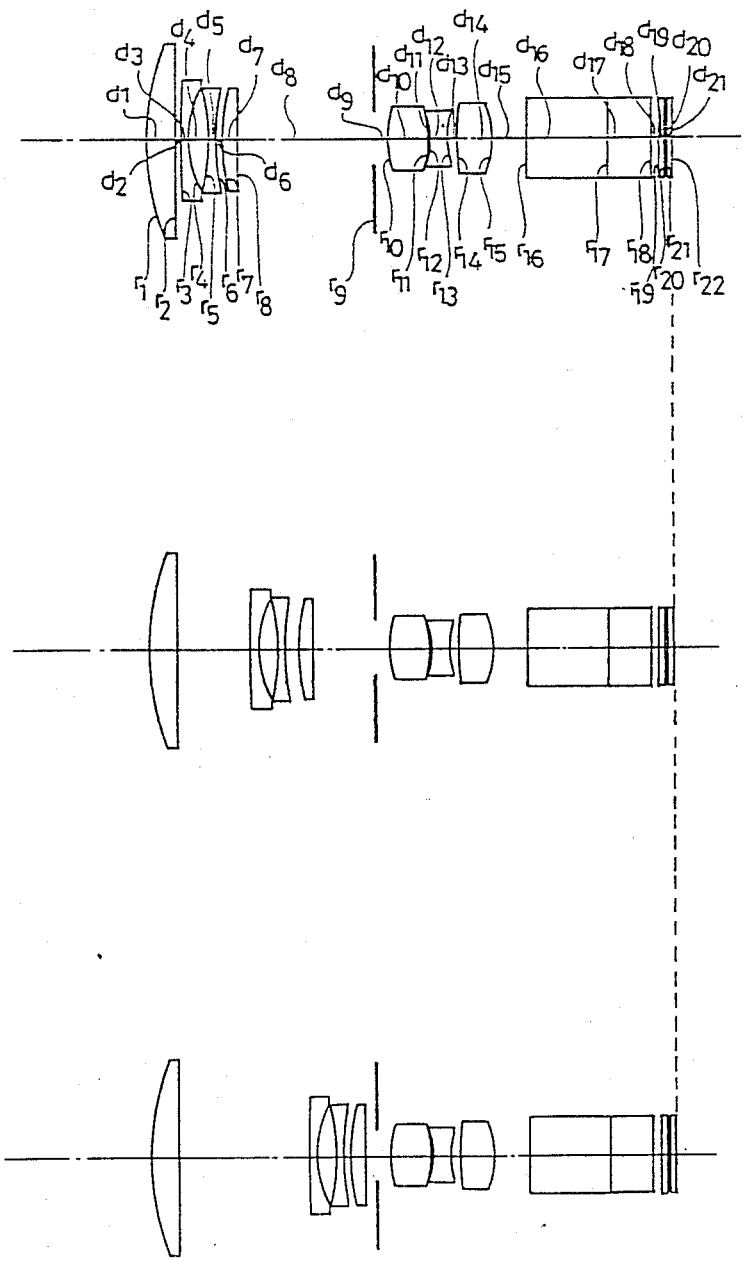
FIG. 2 shows sectional views illustrating compositions of Embodiments 2 to 6 according to the present invention.

Embodiment 2 has the composition illustrated in FIG. 2 wherein the fourth lens unit comprises a positive lens component, a negative lens component and a positive lens component; thus the zoom lens system includes seven lens components in total. The surface on the object side of the last positive lens component is an aspherical surface.

Figure 6:
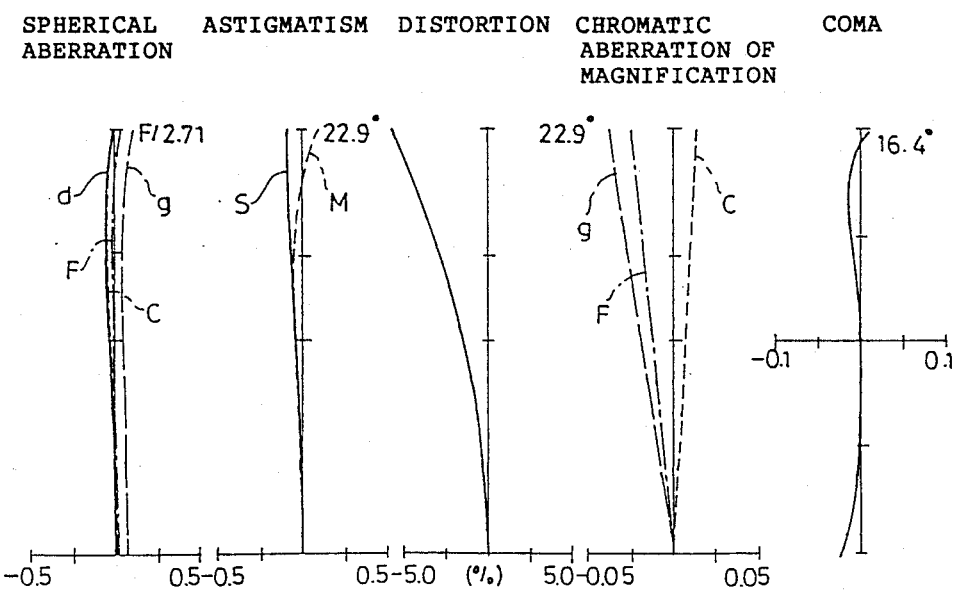
FIGS. 6 to 8 show curves illustrating aberration characteristics of Embodiment 2.
Figure 7:
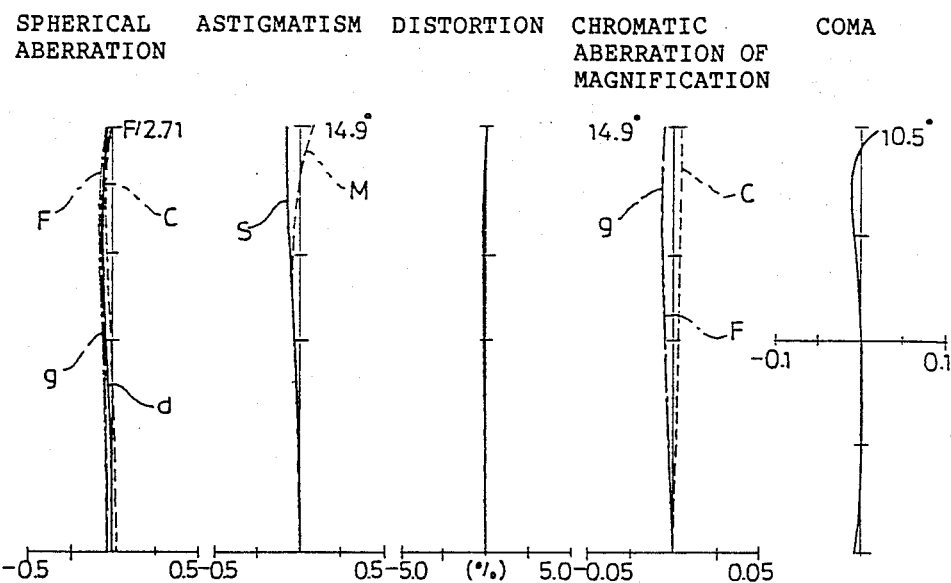
Figure 8:
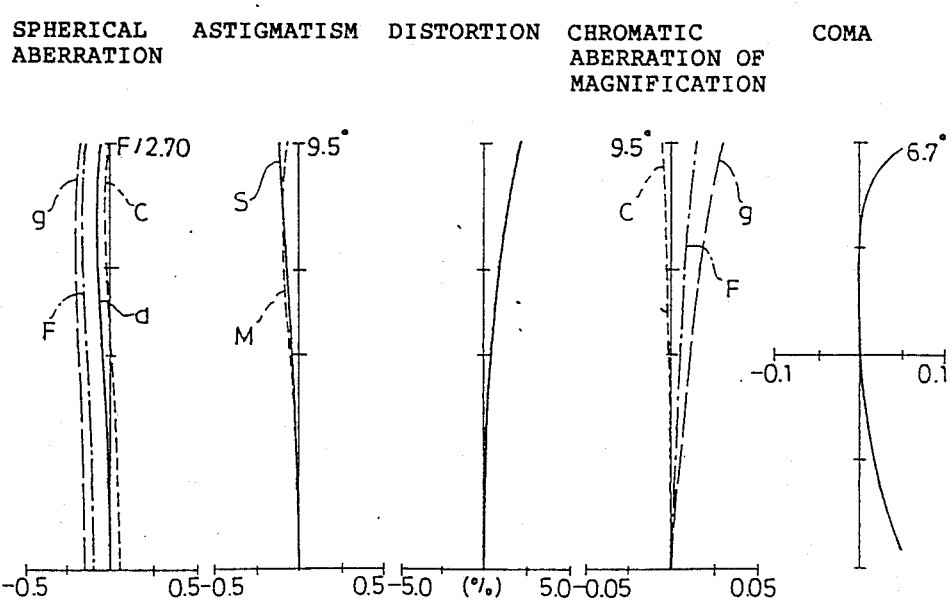

The aberration characteristics at the wide position, intermediate focal length and tele position of Embodiment 2 are illustrated in FIGS. 6, 7 and 8, respectively.

Embodiments 3 and 4 also have the composition illustrated in FIG. 2 and includes 7 lens components. All lens components in these embodiments are spherical lens components.

Figure 9:
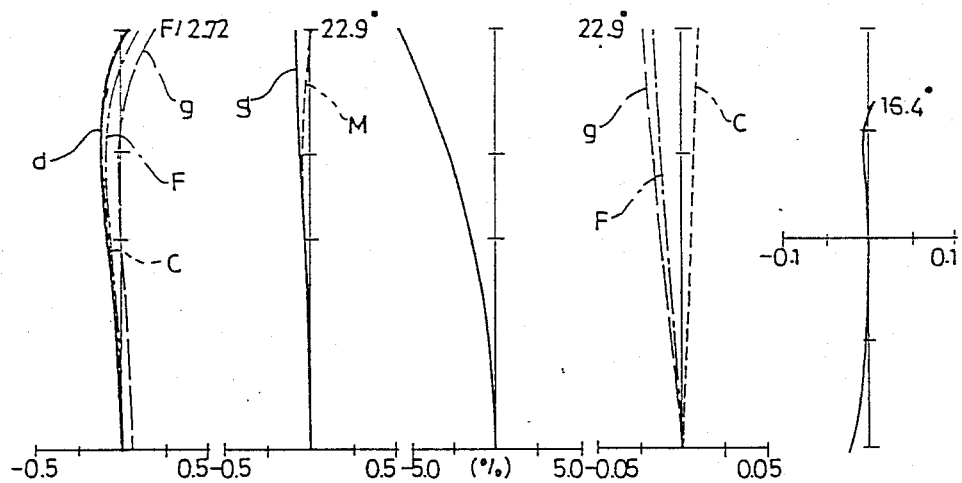
FIGS. 9 to 11 show curves illustrating aberration characteristics of Embodiment 3.
Figure 10:
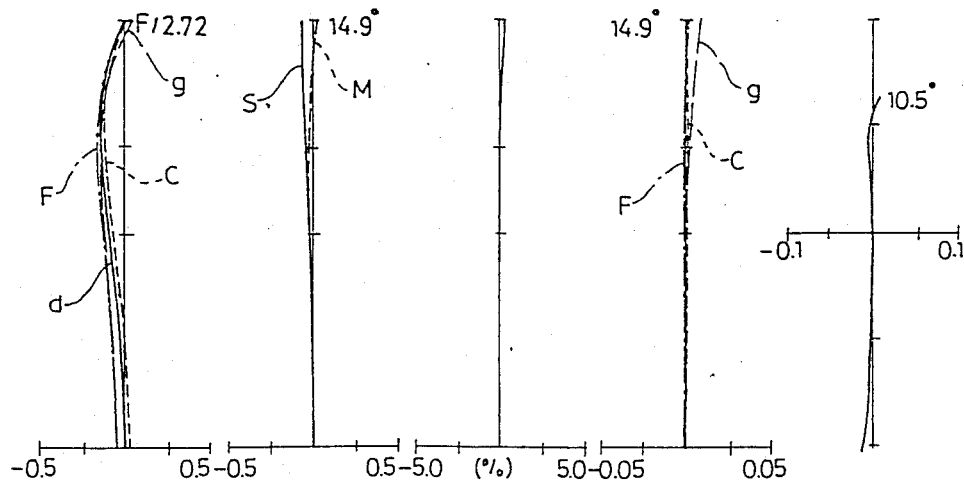
Figure 11:
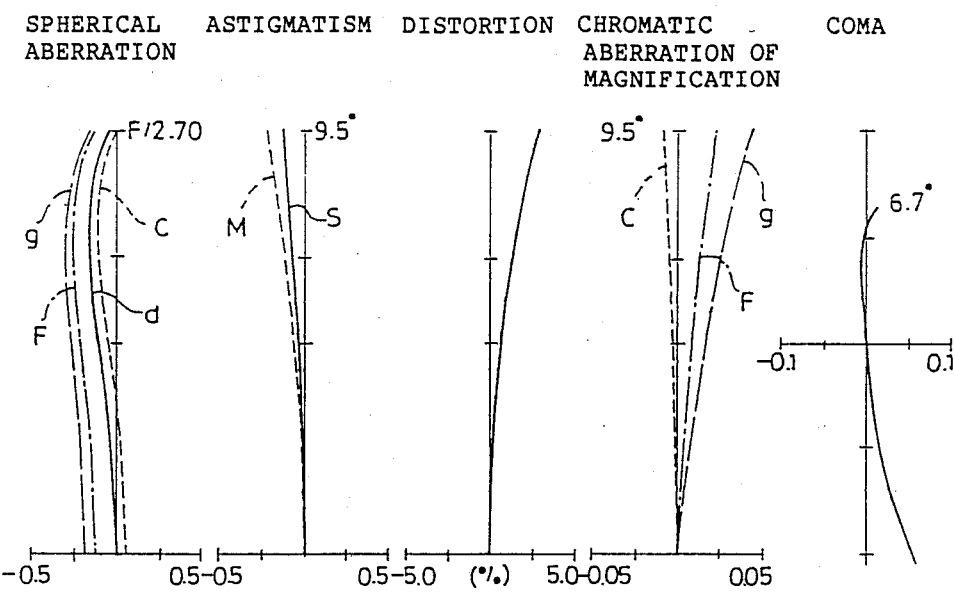
Figure 12:
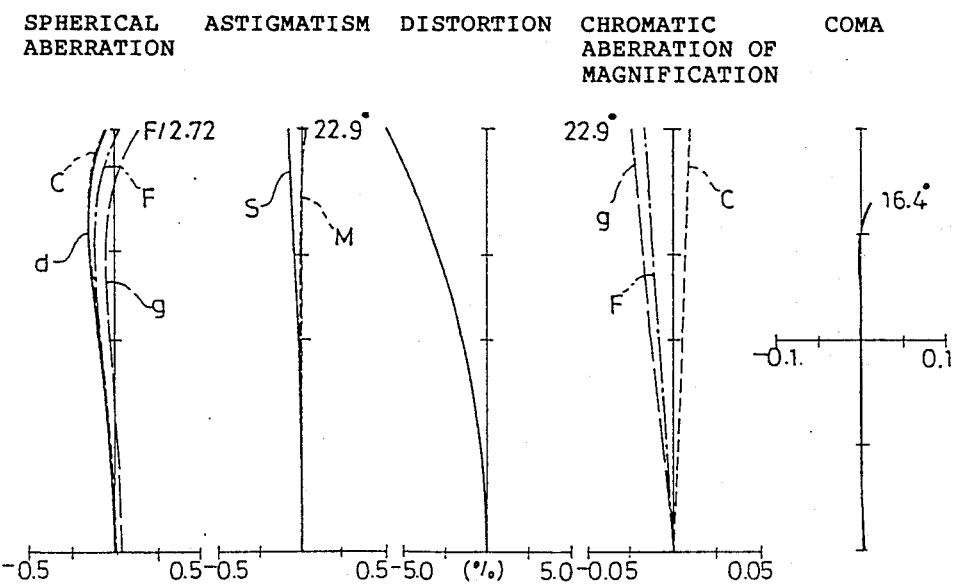
FIGS. 12 to 14 show curves illustrating aberration characteristics of Embodiment 4.
Figure 13:
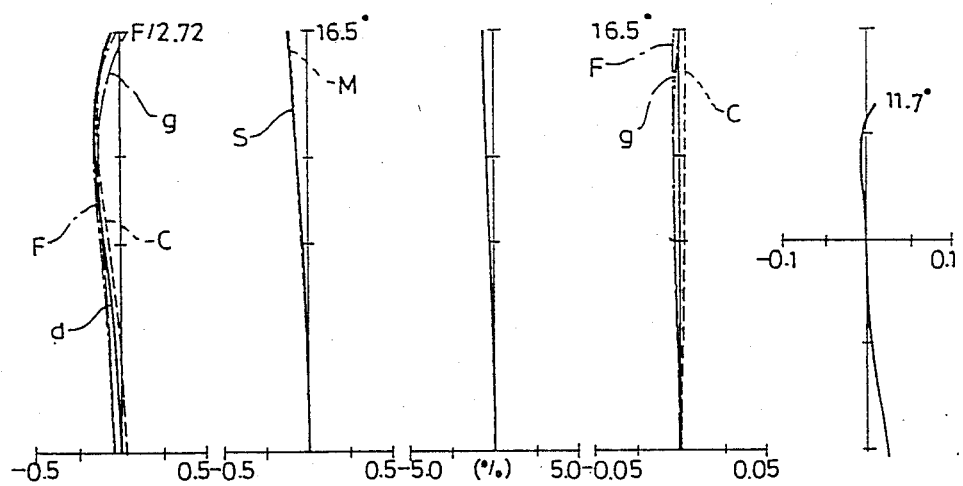
Figure 14:
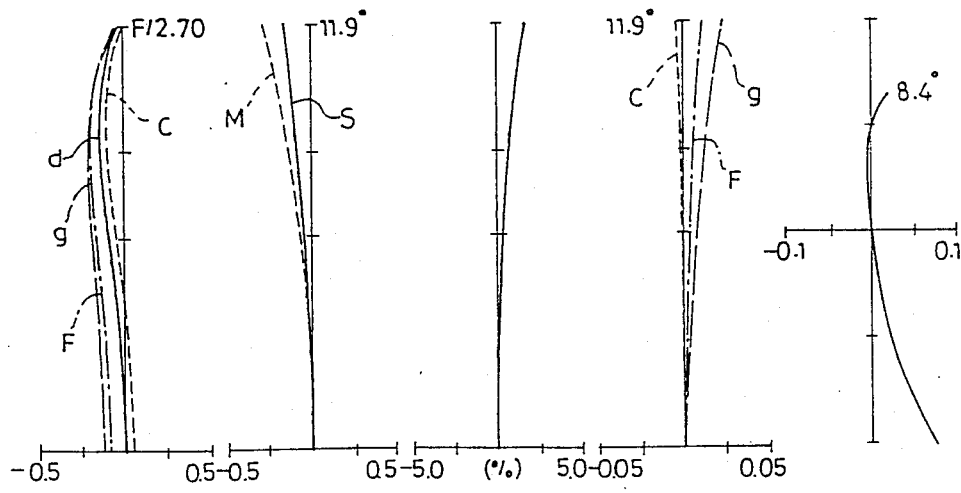

The aberration characteristics at the wide position, intermediate focal length and tele position of Embodiment 3 are illustrated in FIGS. 9, 10 and 11, respectively, and the aberration characteristics at the wide position, intermediate focal length and tele position of Embodiment 4 are illustrated in FIGS. 12, 13 and 14, respectively.

Embodiment 5 also has the composition illustrated in FIG. 2 wherein all lens components other than those in the fourth lens unit are made of plastic. The first surface is aspherical.

Figure 15:
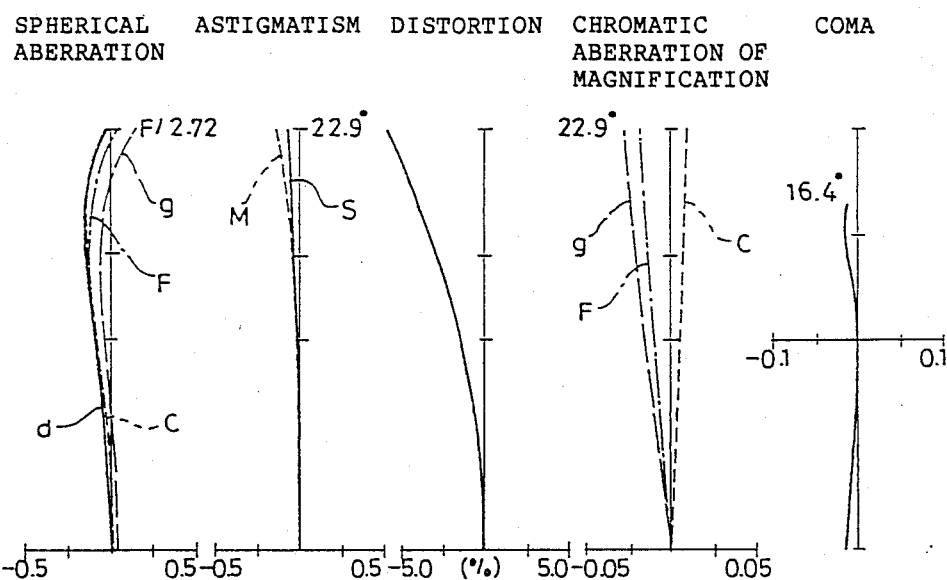
FIGS. 15 to 17 show curves illustrating aberration characteristics of Embodiment 5.
Figure 16:
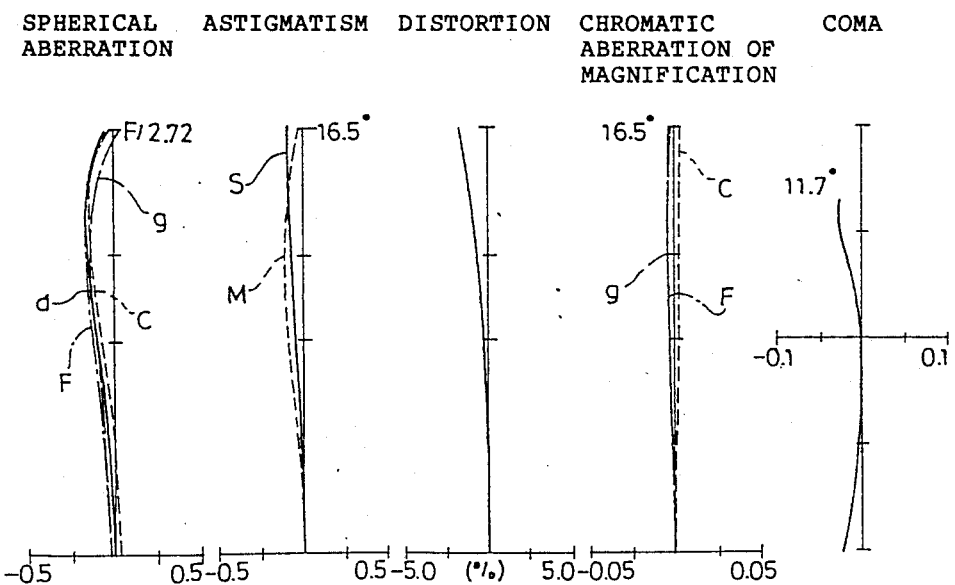
Figure 17:
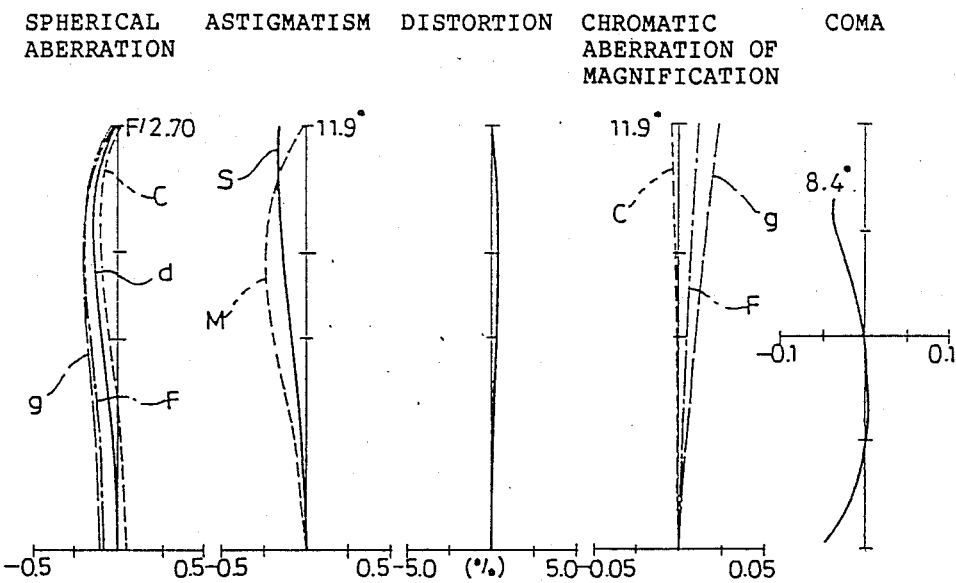

The aberration characteristics at the wide position, intermediate focal length and tele position of Embodiment 5 are illustrated in FIGS. 15, 16 and 17, respectively.

Figure 18:
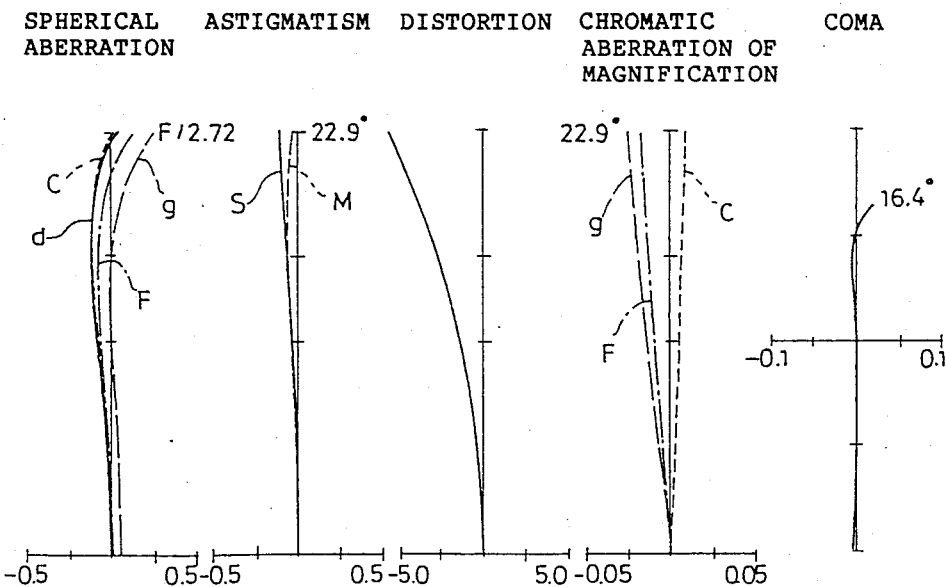
FIGS. 18 to 20 show curves illustrating aberration characteristics of Embodiment 6.
Figure 19:
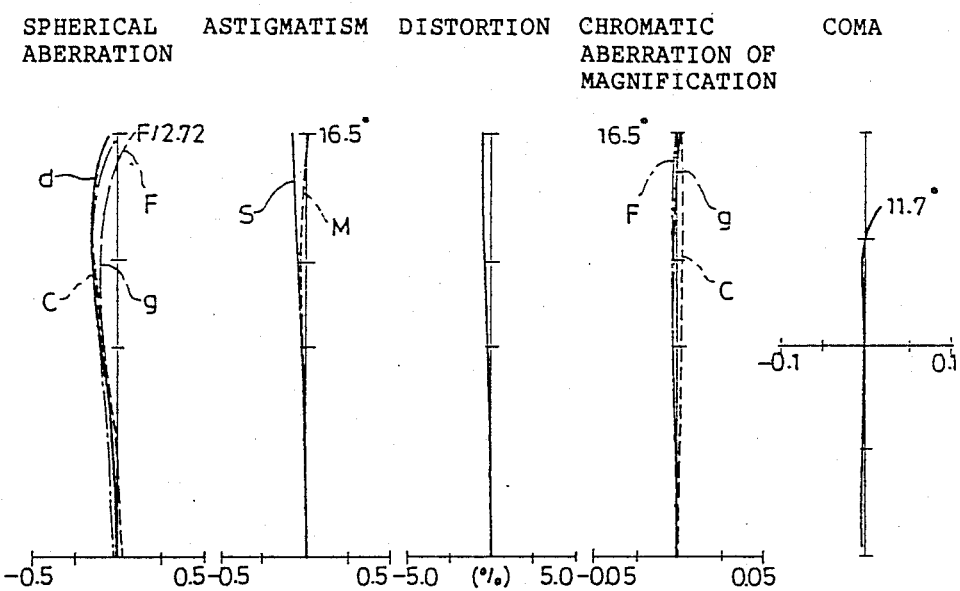
Figure 20:
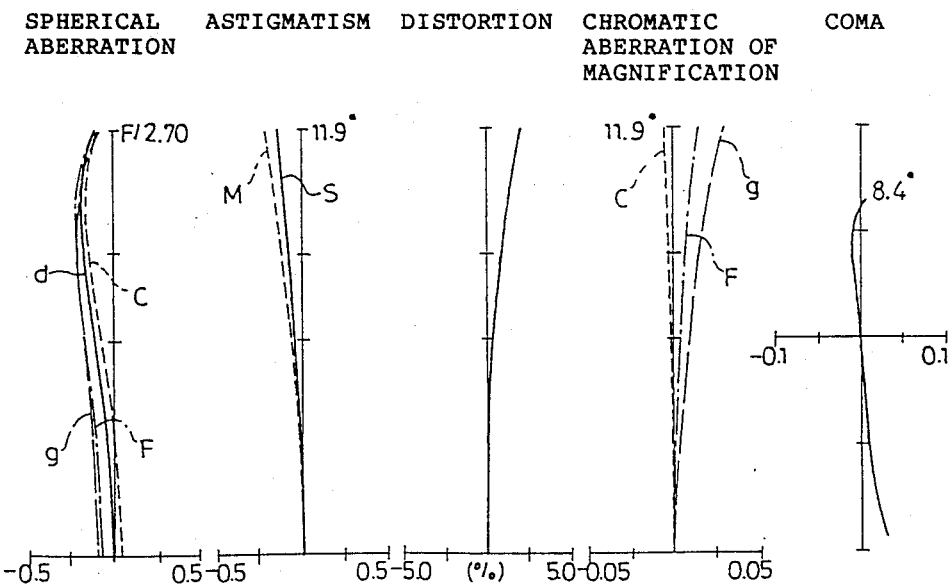
Figure 21:
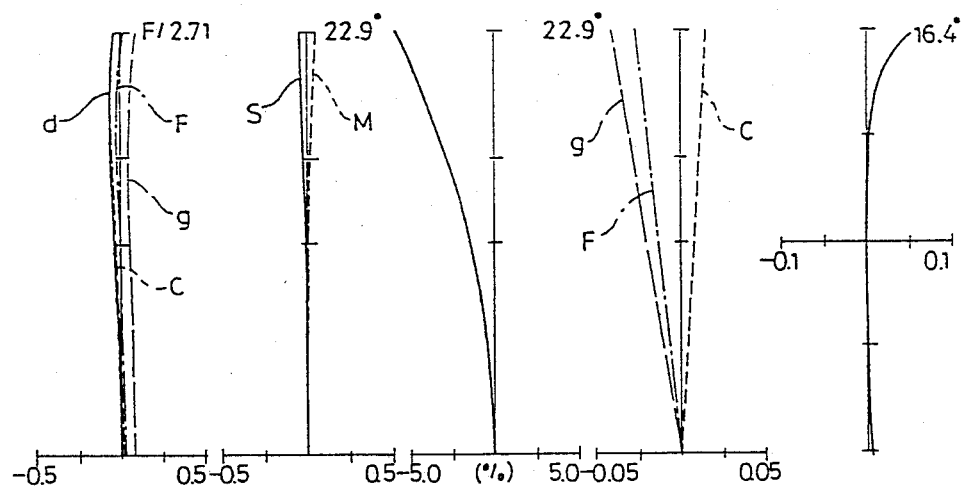
FIGS. 21 to 23 show curves illustrating aberration characteristics of Embodiment 7.
Figure 22:
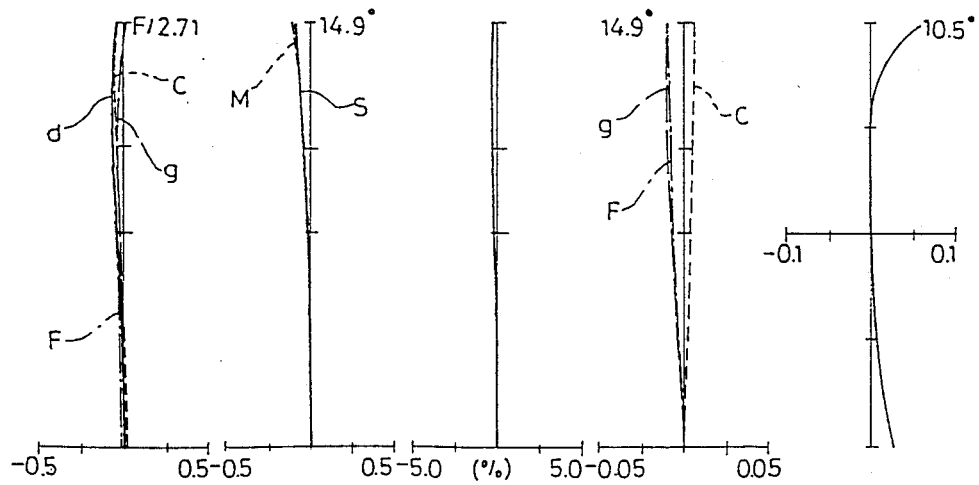
Figure 23:
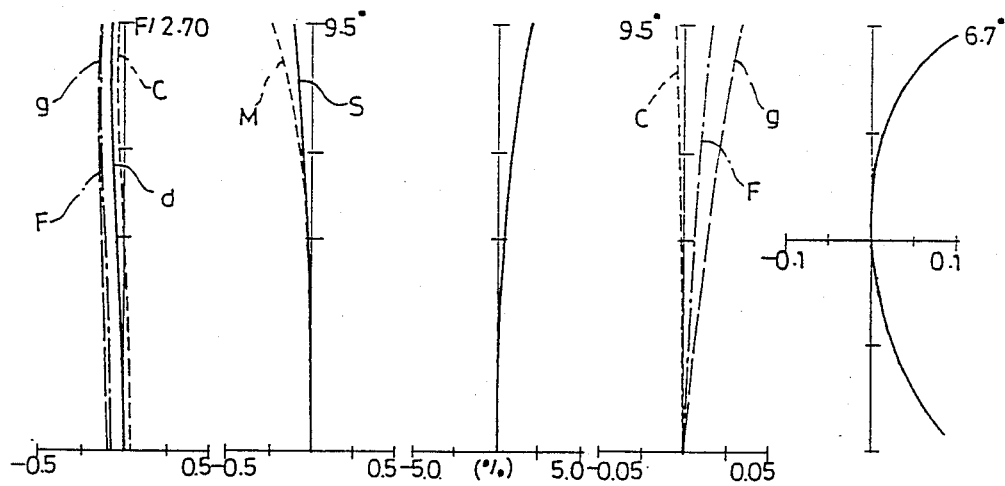

Embodiment 6 is a lens system ncluding seven lens components as illustrated in FIG. 2. One of the negative lens components in the second lens unit and the lens component in the third lens unit are made of plastic. The aberration characteristics at the wide position, intermediate focal length and tele position of Embodiment 6 are illustrated in FIGS. 18, 19 and 20, respectively. Embodiment 7 is a lens system including eight lens components as illustrated in FIG. 1. The aberration characteristics at the wide position, intermediate focal length and tele position of Embodiment 7 are illustrated in FIGS. 21, 22 and 23, respectively.

The aspherical surfaces used in Embodiment 2, etc., are represented by the following formula when the direction of the optical axis is taken as the z axis, the direction perpendicular to the optical axis is taken as the y axis, and the radius of curvature at the vertex of the surface is R:

$$z = \frac{y^2/R}{1 + \sqrt{1 - (y/R)^2}} + Ey^4 + Fy^6 + Gy^8 + \ldots$$

where E, F, G, ... are aspherical coefficients.

The values of the aspherical coefficients, etc., in the embodiments are set forth in the above data lists.

As is understood from the foregoing description, the zoom lens system according to the present invention is a lens system designed for a zooming ratio of 2 to 3 and an aperture ratio of F/2 to F/2.7 which has a small number of lens components, concretely seven to eight, with the first lens unit, which tends to be large and heavy, including a lens component of a small diameter, and in which chromatic aberration and other aberrations are properly corrected.

What is claimed is:

1. A zoom lens system comprising, in the order from the object side, a first lens unit including a positive lens component, a second lens unit of negative refractive power including two negative lens components, a third lens unit having positive refractive power including a positive lens component, and a fourth lens unit including three or four lens components: a positive lens component, a negative lens component and one or two positive lens components, wherein during zooming, the first and fourth lens units are fixed, and the second and third lens units are shifted in the direction of the optical axis with the distance between the second and third lens units being varied for zooming and correcting the shift of the image position, the zoom lens system satisfying the following conditions (1), (2) and (3):

$$0.9 < |\beta_{23S}| < 1.5 \quad (1)$$

$$25 < \nu_{II} - \nu_{III}, \nu_{II} = (\nu_{II-1} - \nu_{II-2})/2 \quad (2)$$

$$0.4 < |\beta_{2T}| < 1 \quad (3)$$

where $\beta_{23S}$ is the composite magnification of the second and third lens units when the focal length of the whole system $f_S = f_W \cdot f_T$ ($f_W$ and $f_T$ are the focal lengths at the wide and tele positions, respectively); $\beta_{2T}$ is the magnification of the second lens unit at the tele position; $\nu_{II-1}$ and $\nu_{II-2}$ are the Abbe numbers of the negative lens components in the second lens unit; and $\nu_{III}$ is the Abbe number of the third lens unit.

2. The zoom lens system of claim 1 further satisfying the following conditions (4), (5) and (6):

$$0.07 < |n_{III} - n_{II}| < 0.3 \quad (4)$$

$$0.5 < r_{III-1} / r_{II-4} < 1.1 \quad (5)$$

$$0.7 < |f_{II\,IIIT}|/\sqrt{f_W \cdot f_T} < 1.2 \quad (6)$$

where $n_{II}$ is the refractive index of one of the negative lens components in the second lens unit, $n_{III}$ is the refractive index of the positive lens component in the third lens unit, $r_{II-4}$ is the radius of curvature of the fourth lens surface of the second lens unit, $r_{III-1}$ is the radius of curvature of the first lens surface (on the object side) of the third lens unit, and $f_{II\,III\,T}$ is the composite focal length of the second and third lens units at the tele position.

3. The zoom lens system of claim 1, wherein the second and third lens units are shifted in the direction of the optical axis in such a manner that the distance between the first and second lens units is minimum at the wide position and that the distance between the second and third lens units and the distance between the third and fourth lens units are minimum at the tele position.

4. The zoom lens system of claim 1 or 2, wherein the fourth lens unit comprises, in the order from the object side, a positive lens component, a negative lens component, a positive lens component and a positive lens component.

5. The zoom lens system of claim 1 or 2, wherein the fourth lens unit comprises, in the order from the object side, a positive lens component, a negative lens component and a positive lens component.

6. The zoom lens system of claim 5, wherein the surface on the object side of the first lens unit is an aspherical surface.

7. The zoom lens system of claim 5, wherein a lens surface of the fourth lens unit is a aspherical surface.

* * * * *

UNITED STATES PATENT AND TRADEMARK OFFICE
CERTIFICATE OF CORRECTION

PATENT NO. : 4,911,540

DATED : March 27, 1990

INVENTOR(S) : Shinichi MIHARA

It is certified that error appears in the above-identified patent and that said Letters Patent is hereby corrected as shown below:

Column 1, line 41, change "comprises" to --comprise--.

Column 1, line 46, change "are large" to --is large--.

Column 2, line 24, change "ration" to --ratio--.

Column 2, line 51, change "$\sqrt{fw \cdot fw}$" to --$\sqrt{fw \cdot f_t}$--.

Column 2, line 67, change "ing chromatic" to --ing the chromatic--.

Column 3, line 1, between "Overcorrecting" and "chromatic" insert --the--.

Column 3, line 19, change "Dhas" to --$D_{II}$ has--.

Column 3, line 62, change "do not" to --does not--.

Column 4, line 5, change "$B_{2T} | \leq $ in" to --$|B_{2T}| \leq 1$ in--.

Column 4, lin3 22, change "D" to --$D_{II}$--.

Column 4, lines 40 and 41, skip a line between "(5)" and "(6)".

Column 4, line 55, change "pwer" to --power--.

UNITED STATES PATENT AND TRADEMARK OFFICE
CERTIFICATE OF CORRECTION

PATENT NO. : 4,911,540
DATED : March 27, 1990
INVENTOR(S) : Shinichi MIHARA

It is certified that error appears in the above-identified patent and that said Letters Patent is hereby corrected as shown below:

Column 4, line 67, change "tends" to --tend--.

Column 5, line 16, change "compos-" to --composi---.

Column 6, line 23, change "26.845" to --16.845--.

Column 6, line 24, change "$V_{III} - V_{III}$" to --$V_{II} - V_{III}$--

Column 8, line 9, change "16.5304 to ---16.5304--.

Column 9, line 37, change "21.2632" to ---21.2632--.

Column 10, line 63, change "nents" to --nent--.

Column 11, line 30, change "ncluding" to --including--.

Column 11, line 37, "Embodiment 7" should begin a new paragraph.

UNITED STATES PATENT AND TRADEMARK OFFICE
CERTIFICATE OF CORRECTION

PATENT NO. : 4,911,540

DATED : March 27, 1990

INVENTOR(S) : Shinichi MIHARA

It is certified that error appears in the above-identified patent and that said Letters Patent is hereby corrected as shown below:

Column 12, line 23, change $--f_S=fw.f_T"$ to $--f_S=\sqrt{f_W \cdot f_T}--$.

Column 12, line 67, change "a" to --an--.

Signed and Sealed this

Twenty-fifth Day of June, 1991

Attest:

HARRY F. MANBECK, JR.

*Attesting Officer*

*Commissioner of Patents and Trademarks*